United States Patent
Wang et al.

(10) Patent No.: US 9,838,318 B2
(45) Date of Patent: Dec. 5, 2017

(54) TCP CONGESTION CONTROL FOR LARGE LATENCY NETWORKS

(71) Applicant: CDF KE YUAN

(72) Inventors: Jingyuan Wang, Beijing (CN);
Jiangtao Wen, La Jolla, CA (US);
Yuxing Han, Los Angeles, CA (US);
Jun Zhang, Beijing (CN)

(73) Assignee: CDF KE YUAN, Shenzhen (CN)

( * ) Notice: Subject to any disclaimer, the term of this patent is extended or adjusted under 35 U.S.C. 154(b) by 264 days.

(21) Appl. No.: 14/369,360

(22) PCT Filed: Dec. 27, 2012

(86) PCT No.: PCT/US2012/071839
§ 371 (c)(1),
(2) Date: Jun. 27, 2014

(87) PCT Pub. No.: WO2013/101942
PCT Pub. Date: Jul. 4, 2013

(65) Prior Publication Data
US 2015/0043339 A1    Feb. 12, 2015

Related U.S. Application Data

(60) Provisional application No. 61/580,784, filed on Dec. 28, 2011.

(51) Int. Cl.
*H04L 12/801* (2013.01)
*H04L 29/06* (2006.01)
(Continued)

(52) U.S. Cl.
CPC ........ *H04L 47/193* (2013.01); *H04L 12/6418* (2013.01); *H04L 29/06115* (2013.01);
(Continued)

(58) Field of Classification Search
CPC ....... H04L 47/12; H04L 47/14; H04L 47/125; H04L 47/127; H04L 47/16; H04L 47/193;
(Continued)

(56) References Cited

U.S. PATENT DOCUMENTS 6,643,259 B1 * 11/2003 Borella .................. H04L 47/10
370/231
2011/0249553 A1 * 10/2011 Wang ...................... H04L 47/27
370/230

OTHER PUBLICATIONS

Wang, et al., "TCP-FIT: An Improved TCP Congestion Control Algorithm and its Performance", IEEE INFOCOM 2011.*
(Continued)

*Primary Examiner* — Noel Beharry
*Assistant Examiner* — Ruihua Zhang
(74) *Attorney, Agent, or Firm* — Gokalp Bayramoglu

(57) ABSTRACT

A congestion control mechanism for TCP communication sessions is described. The congestion control mechanism adjusts the size of the congestion window based on a number of parallel virtual TCP Hybla connections. The number of parallel virtual TCP Hybla connections used to determine the congestion window can be dynamically adjusted. The enhanced TCP Hybla congestion control mechanism provides improved throughput for heterogenous networks having a high latency link and having possible packet loss.

15 Claims, 7 Drawing Sheets

(51) Int. Cl.
    *H04L 12/64*       (2006.01)
    *H04L 12/26*       (2006.01)
    *H04W 80/06*      (2009.01)

(52) U.S. Cl.
    CPC .......... *H04L 43/0864* (2013.01); *H04L 47/11* (2013.01); *H04L 47/12* (2013.01); *H04L 65/1066* (2013.01); *H04W 80/06* (2013.01)

(58) Field of Classification Search
    CPC . H04L 47/11; H04L 65/1066; H04L 43/0864; H04L 12/6418; H04L 29/06115; H04L 65/10; H04W 80/06
    See application file for complete search history.

(56) References Cited

OTHER PUBLICATIONS

Wang, J et al.;, "TCP-FIT: An improved TCP congestion control algorithm and its performance," INFOCOM, 2011 Proceedings IEEE, vol., No., pp. 2894-2902, Apr. 10-15, 2011 doI: 10.1109/INFCOM.2011.5935128 URL: http://ieeexplore.ieee.org/stamp/stamp/jsp?tp=&arnumber=5935128&isnumber=5934870.

\* cited by examiner

TCP CONGESTION CONTROL FOR LARGE LATENCY NETWORKS

RELATED APPLICATION

This application claims priority to International Application No. PCT/US2012/071839 filed Dec. 27, 2012, which claims priority to previously filed U.S. Provisional application Ser. No. 61/580,784 filed Dec. 28, 2011, which is incorporated by reference in its entirety.

TECHNICAL FIELD

The current description relates generally to data communication over a computer network, and more particularly to a method and apparatus for Transmission Control Protocol (TCP) congestion control in large latency networks.

BACKGROUND

The function of a TCP congestion control mechanism is to adjust the rate with which the protocol sends packets to the network using a congestion control window Cwnd. A good congestion control mechanism can fully utilize the bandwidth while avoiding over-driving the network and thereby creating packet losses. Since the introduction of the first widely used TCP congestion control mechanism, TCP Reno, many TCP congestion control mechanisms have been proposed. Different congestion control mechanisms attempt to address various shortcomings of other congestion control mechanisms depending upon different network characteristics.

One particular network type that is difficult to provide a congestion control mechanism for that will fairly and fully utilize the network bandwidth is a heterogenous network that includes both high latency links and low latency links. One attempt at improving the congestion control mechanisms for heterogenous, high latency networks is TCP-Hybla. TCP-Hybla is similar to TCP Reno, in that it adjusts a congestion window (Cwnd) size based on the receipt of ACK packets and on a timeout of receiving the ACK. The congestion window controls the number of allowable unacknowledged packets that can be in transit. In standard TCP Reno the Cwnd is increased by a maximum segment size (MSS) for each non-duplicate ACK received. When a timeout occurs and the transmitted packet has not been acknowledged, Cwnd is decreased to 1 MSS. The increase in the window size is based on the RTT, and so high latency links do not fully utilize the available bandwidth. TCP Hybla attempts to increase the bandwidth use for high latency networks by removing the dependence of the throughput on RTT. TCP-Hybla adjusts Cwnd according to a normalized round trip time used to equalize the Additive Increase and Multiplicative Decrease (AIMD) performance of the congestion control mechanism. The throughput of TCP-Hybla is:

$$T^R = \frac{1}{RTT_0}\sqrt{\frac{2}{3PLR}}$$

As can be seen, the dependence of the throughput on RTT is removed and as such, the high latency links are not penalized.

Although TCP-Hybla can provide good throughput for high latency links, it cannot fully utilize the bandwidth when there is high packet loss, as may be the case for wireless links.

An additional or alternative TCP congestion control mechanism for heterogeneous networks with a high latency link and that may exhibit packet loss is desirable.

SUMMARY

In accordance with the description there is provided a method for congestion control of a communication session over a heterogeneous network having a high latency link. The method comprises determining a round trip time (RTT) for the communication session; determining a normalized RTT ($\rho$) based on an equalizing round trip time ($RTT_0$); determining a number, N, of virtual communication sessions; and setting a congestion window (Cwnd) size for the communication session based on N TCP virtual communication sessions and $\rho$.

In accordance with the description there is further provided a computing device for communicating over a network. The computing device comprises a processor for executing instructions; and a memory for storing instructions, which when executed by the processor configure the computing device to perform a method for congestion control. The method comprises determining a round trip time (RTT) for the communication session; determining a normalized RTT ($\rho$) based on an equalizing round trip time ($RTT_0$); determining a number, N, of virtual communication sessions; and setting a congestion window (Cwnd) size for the communication session based on N TCP virtual communication sessions and $\rho$.

In accordance with the description there is further provided a non-transitory computer readable medium storing instructions for configuring a computing device to perform a method for congestion control. The method comprises determining a round trip time (RTT) for the communication session; determining a normalized RTT ($\rho$) based on an equalizing round trip time ($RTT_0$); determining a number, N, of virtual communication sessions; and setting a congestion window (Cwnd) size for the communication session based on N TCP virtual communication sessions and $\rho$.

BRIEF DESCRIPTION OF THE DRAWINGS

Illustrative embodiments of the invention will now be described with reference to the following drawings in which.

DESCRIPTION

Figure 1:
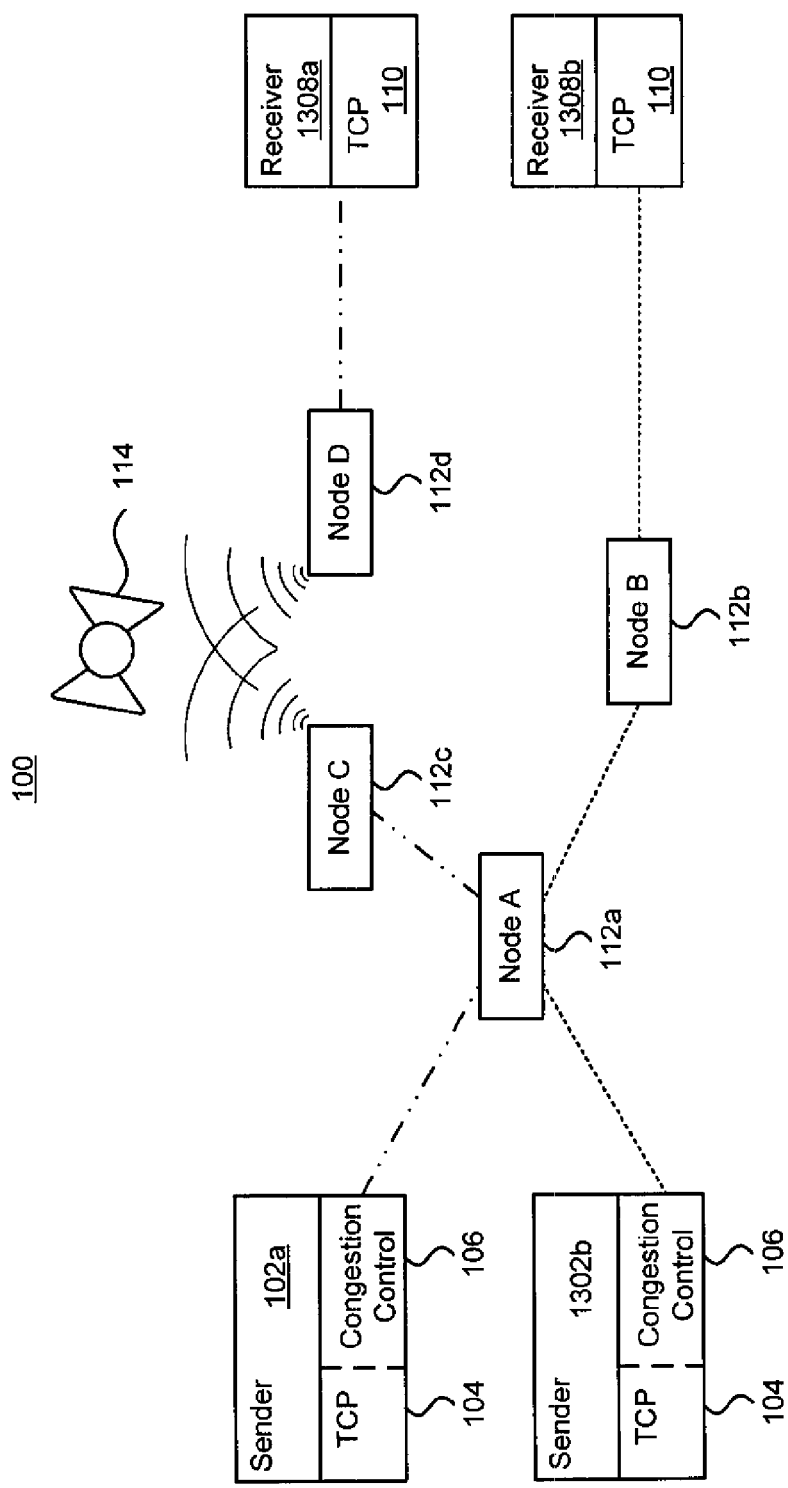
FIG. 1 depicts in a block diagram an illustrative network in which the TCP-FIT congestion control mechanism may be used.

A TCP congestion control mechanism that can eliminate penalization of TCP over networks with high latency links, while achieving high throughput performance even in the presence of high packet loss rate and packets reorder is described herein. As described further, the congestion control mechanism controls the window size, Cwnd, based on a number of virtual Hybla connections. The number of virtual connections used to set the window size may be adjusted dynamically using a queuing delay based mechanism to keep a balance between network utilization and congestion avoidance.

Additive Increase and Multiplicative Decrease (AIMD) is the most widely used congestion control algorithm in TCP congestion control. In AIMD algorithm, the congestion control window Cwnd of a TCP sender is adjusted by $$\text{Each ACK: } Cwnd \leftarrow Cwnd + a$$

$$\text{Each Loss: } Cwnd \leftarrow Cwnd - b \cdot Cwnd \tag{1}$$

In the expression (1), a and b are the increase and decrease factor of AIMD. AIMD increase its window by a to probe the network in every RTT (Round-Trip Time), and decrease the window by b·cwnd, where b∈(0,1), to recover the network from congestion when a packet loss signaled congestion event is detected. The average throughput of (1) is $$T = \frac{1}{RTT} \sqrt{\frac{a(2-b)}{2PLR \cdot b}} \tag{2}$$

As is clear from above, equation (2) is a function of network RTT and PLR (Packet Loss Rate). In standard TCP Reno algorithm, a is set to 1 and b is set to $$\frac{1}{2}.$$

Therefore, the average throughput of TCP Reno is $$T^R = \frac{1}{RTT} \sqrt{\frac{2}{3PLR}} \tag{3}$$

From equation (3), it can be seen that networks with high-latency, and so large RTT, will seriously degrade the throughput performance of TCP Reno.

TCP Hybla attempts to eliminate penalization of TCP connections that incorporate a high-latency terrestrial or satellite radio link, due to their longer round trip times. In TCP Hybla, the increase factor of 1 is set as $$a^H = \frac{RTT}{RTT_0} \tag{4}$$

where $RTT_0$ is a normalized round trip time used to equalize the AIMD performance. The default setting of $RTT_0$ is 15 ms, although other settings for $RTT_0$ are possible. Therefore, the throughput of TCP Hybla can be modeled as $$T^H = \frac{1}{RTT_0} \sqrt{\frac{2}{3PLR}} \tag{5}$$

As can be seen from above, the negative effects of high network latency is removed. However, the throughput is dependent upon the packet loss rate, and as such will not fully utilize the bandwidth in the presence of high packet loss.

TCP Hybla can be enhanced to improve the performance of heterogeneous networks with high latency networks that may experience pack loss. In the enhanced TCP hybla congestion control mechanism, the congestion control window is adjusted by $$\text{Each ACK: } Cwnd \leftarrow Cwnd + N \cdot a^H \tag{6}$$

$$\text{Each Loss: } Cwnd \leftarrow Cwnd - \frac{2}{3N+1} \cdot Cwnd$$

In other words, the increase and decrease factors of (2) for the enhanced TCP Hybla congestion control mechanism are $$a = N \cdot \frac{RTT}{RTT_0}, \tag{7}$$

$$b = \frac{2}{3N+1}$$

where N is a dynamic parameter as discussed below. According to the expression (2), the throughput function of (6) is $$T^E = \frac{N}{RTT_0} \sqrt{\frac{2}{3PLR}} \tag{8}$$

Compared to the throughput function (5) it can be seen that the throughput of the enhanced Hybla congestion control mechanism is N times that of TCP Hybla under the same network conditions.

The number N of Hybla sessions simulated in the enhanced Hybla session can be dynamically adjusted according to $$N_{t+1} := \max\left\{1, N_t + \beta - N_t \cdot \frac{RTT_t - RTT_{min}}{\alpha \cdot RTT_t}\right\}, \tag{9}$$

where $N_t$ is the N at the updating period t, $RTT_t$ is the average RTT for the updating period t, $RTT_{min}$ is the minimal observed RTT value for a given observation period, which may correspond to t. α and β may be preset positive parameters. The values of α and β may be tuned experimentally to provide desirable performance for various networks. Illustrative values are $$\alpha = \frac{1}{2}$$

and β=1. For β=1 the expectation of N from (9) is $$E[N] = \max\left\{1, \frac{\alpha \cdot RTT_t}{RTT_t - RTT_{min}} N_t\right\}. \qquad (10)$$

Plugging (10) into (8), the throughput function of the enhanced Hybla congestion control mechanism for given PLR and RTT is $$T^F = \max\left\{\frac{1}{RTT_0}, \frac{\alpha}{q} \cdot \frac{RTT}{RTT_0}\right\} \sqrt{\frac{3}{2PLR}}, \qquad (11)$$

Where q=RTT−RTT$_{min}$, and represents a network queuing delay. As shown in the expression (11), the throughput of the enhanced Hybla congestion control mechanism will increase with the increasing of network RTT, which makes the congestion control mechanism well suited to high latency links.

FIG. 1 depicts in a block diagram an illustrative network in which the enhanced TCP-Hybla congestion control mechanism may be used. The network 100 comprises a plurality of senders 102a, 102b (referred to collectively as senders 102), each of which comprises a TCP stack 104 that includes the enhanced TCP-Hybla congestion control mechanism 106. The senders 102 send packets of information to a plurality of receivers 108a, 108b (referred to collectively as receivers 108). The receivers 108 each comprise a TCP stack 110. The TCP stacks 110 of the receivers 108 are depicted without a congestion control mechanism. Although the TCP implementation of the receivers 108 may include the congestion control mechanism, it is the senders 102 that are responsible for the congestion control and as such it is omitted from the receivers 108 of FIG. 1.

The senders 102 transmit the packets to the receivers 108 over a network comprised of a plurality of links between nodes 112a, 112b, 112c, 112d (referred to collectively as nodes 112). One of the links between nodes is a high latency link. In FIG. 1, the link between nodes 122c and 112d is depicted as a high latency link provided by a satellite connection 114. The high latency link does not need to be provided by a link between two nodes, instead the high latency may be provided through a combination of links that each individually may not be high latency but combined provide a high latency connection between a sender and receiver.

One of the nodes will be a bottleneck. The bottleneck link has a bandwidth that it can transmit packets at. When the number of packets arriving at the bottleneck link 112 exceeds the transmission bandwidth capacity 114, the packets 116 cannot be transmitted right away and so are temporarily stored in a buffer of the node. If packets arrive while the buffer is full, the node is congested and some packet(s) will be dropped. The timeout timer of the sender associated with the dropped packet will expire, and the congestion control mechanism will reduce the Cwnd of the session so that packets will be transmitted more slowly.

Figure 2:
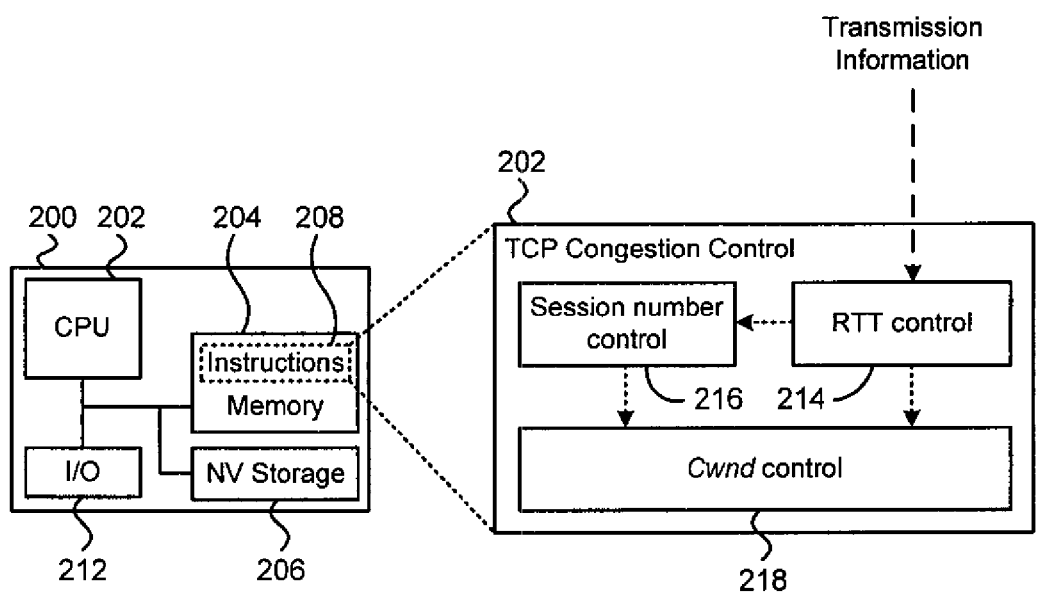
FIG. 2 depicts in a block diagram an illustrative computing device that implements an enhanced TCP-Hybla congestion control mechanism.

FIG. 2 depicts in a block diagram an illustrative computing device that may be used to implement the enhanced TCP-Hybla congestion control mechanism described herein. The computing device 200 comprises a processing unit 202 for executing instructions and a memory unit for storing instructions. The memory unit may include volatile memory 204 and non-volatile storage 206. The memory unit stores instructions 208 that when executed by the processing unit 202 configure the computing device 200 to provide the enhanced TCP-Hybla congestion control mechanism 210. The computing device 200 may further comprise an input/output (I/O) interface 212 for connecting devices to the computing device 200.

The enhanced TCP-Hybla congestion control mechanism 210 comprises an RTT control component 214 that that determines the round trip time of packets. The RTT control component 214 may also determine other times associated with round trip times. For example, the RTT control component 214 may further determine an average RTT, a minimum and maximum RTT. The determined RTT information is used by a session number control component 216 that adjusts the dynamic value of the number of virtual Hybla connections used for setting the size of Cwnd. A Cwnd control component 218 uses the determined number of virtual connections to set the size of the Cwnd for the connection when an ACK packet is received or a timeout timer expires, indicating a lost packet.

Figure 3:
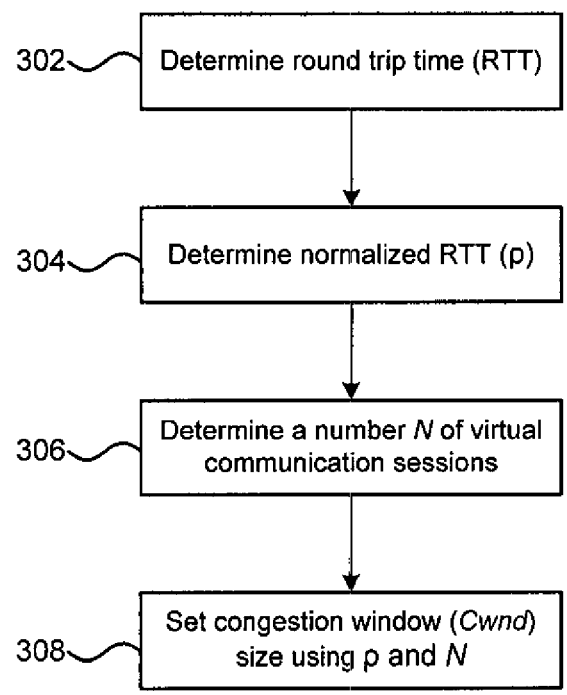
FIG. 3 depicts in a flow chart an illustrative method of congestion control using an enhanced TCP-Hybla congestion control mechanism.

FIG. 3 depicts in a flow chart an illustrative method of congestion control using the enhanced TCP-Hybla congestion control mechanism. The method 300 determines a round trip time (RTT) for the connection (302). The RTT can be determined from a time elapsed between when a packet is transmitted and when an ACK is received for the packet. A normalized RTT (ρ) is determined from the determined RTT (304). The normalized RTT can be determined by dividing the RTT by a normalization factor RTT$_0$. The normalization factor can be preset, for example at 10 ms, 15 ms, 20 ms, 25 ms or other values depending upon the network. Alternatively, the normalization factor may be determined by monitoring the RTT of network connections. As an example, RTT$_0$ may be set as the minimum RTT time observed from the TCP session or from other TCP sessions on the same computing device. A number, N, of virtual TCP-Hybla communication sessions may be determined (306). The number N may be determined as set forth in equation (9) above. Once the number N of TCP-Hybla sessions has been determined, the congestion window size Cwnd can be set using the normalized RTT, ρ, and N (308). The size of the congestion window can be set according to equations (6) and (7) above.

Figure 4:
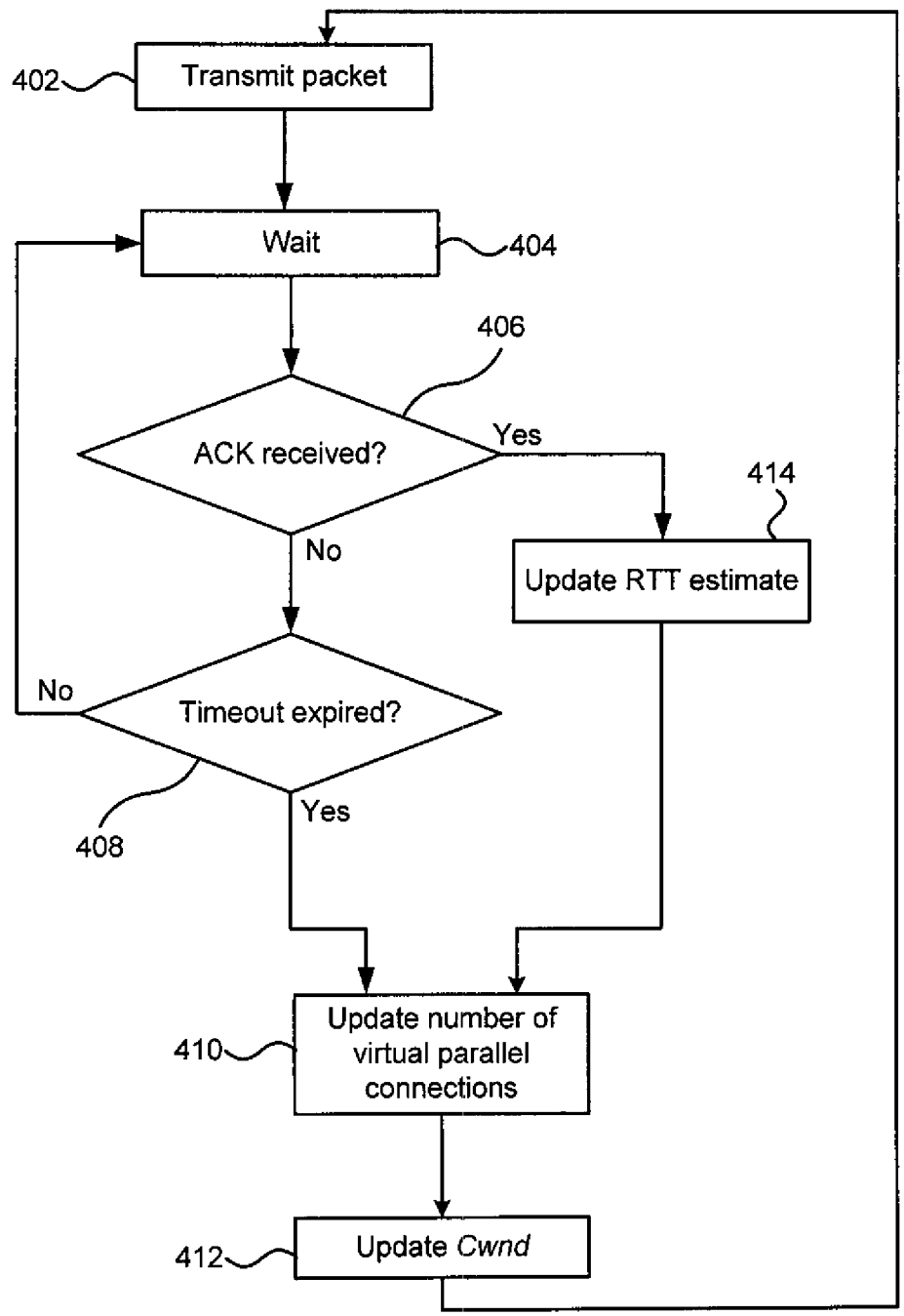
FIG. 4 depicts in a flow chart a further illustrative embodiment of a method of congestion control using an enhanced TCP-Hybla congestion control mechanism.

FIG. 4 depicts in a flow chart a further illustrative embodiment of a method of congestion control. The method 400 begins with transmitting a packet (402). The method waits (404) and checks if an ACK for the transmitted packet has been received (406). If an ACK has not been received (No at 406), the method determines if a timeout associated with the transmitted packet has expired (408) and if the timeout has not expired (No at 408), the method returns to wait for the ACK (404). If the timeout has expired (Yes at 408), then a packet loss has occurred. Accordingly the number of virtual sessions used in setting the size of Cwnd is updated (410) and used to update Cwnd (412). When a packet is lost, the size of Cwnd is decreased. Once the size of Cwnd is set, the method may then send another packet when appropriate. When an ACK has been received (Yes at 406), the RTT is updated (414) and the number of virtual sessions used in setting the size of Cwnd is updated (410) and used to update Cwnd (412). When an ACK is received, the size of Cwnd is increased.

An analysis of the network utilization efficiency of the enhanced TCP-Hybla was performed using a simple, but widely adopted, network scenario. In the scenario, S TCP sessions indexed by s∈{1, . . . , S} share a bottleneck link at the same time. The bottleneck link has a bandwidth upper bound B, round-trip propagation delay D and inherent random packet loss rate P. When the S TCP sessions send packets through the bottleneck link, the aggregate throughput is denoted by $T_S = \Sigma_{s \in S} T_S$. The bottleneck link queuing delays q and congestion packet loss rate p are given by $$\begin{cases} p = 0, q = 0, & \text{if } T_S < B, \quad (a) \\ p = f(q), q > 0, & \text{if } T_S = B. \quad (b) \end{cases} \quad (12)$$

$f(\cdot)$ is the define function of the queue management algorithm of the bottleneck link. It is assumed that $f(0)=0$ and $f(\cdot)$ is a non-decreasing function of q.

Theorem 1: If S contains an enhanced TCP-Hybla session, the bottleneck link operates in state (b) of equation (12).

Proof: It is obvious that for any TCP sessions, their aggregate throughput in the network satisfies $\Sigma_{s \in S} T_s \leq B$ since the aggregate throughput of a link cannot exceed the available bandwidth. Suppose the bottleneck link is operating in state ($\alpha$) with q=0. From Equation (11) the throughput of enhanced TCP-Hybla is $T^F \to \infty$. This contradicts with $\Sigma_{s \in S} T_s \leq B$. Therefore, the bottleneck must be operating in state (b).

Theorem 1 shows that enhanced TCP-Hybla can ensure the capacity of a network bottleneck is fully utilized. It is noted that similar conclusions cannot be proven for other TCP Hybla sessions. Since $p \geq 0$ and $q \geq 0$, there is an upper bound for the throughput of a standard TCP Hybla session s for any given P $$T_s = \frac{1}{RTT_0}\sqrt{\frac{3}{2(P+p)}} \leq \frac{1}{RTT_0}\sqrt{\frac{3}{2P}} = T_s^{max}. \quad (13)$$

It is obvious that, for a bottleneck link that contains only TCP Hybla sessions, if the aggregated throughput of all TCP sessions s∈S is consistent with $$\sum_{s \in S} T_s \leq \sum_{s \in S} T_s^{max} = \sum_{s \in S} \frac{1}{RTT_0}\sqrt{\frac{3}{2P}} < B, \quad (14)$$

the bottleneck link works at the unsaturated state ($\alpha$) of (12). The condition (13) only depends on the inherent properties P and B of the bottleneck link. As shown in (13), when the random packet loss rate P of the network is sufficiently high, as may be the case with paths that travel over a wireless network, TCP Hybla sessions are unable to fully utilize network capacity. As such, standard TCP Hybla cannot achieve optimal performance in wireless networks with random packet loss and false loss caused by packets reorder.

Figure 5:
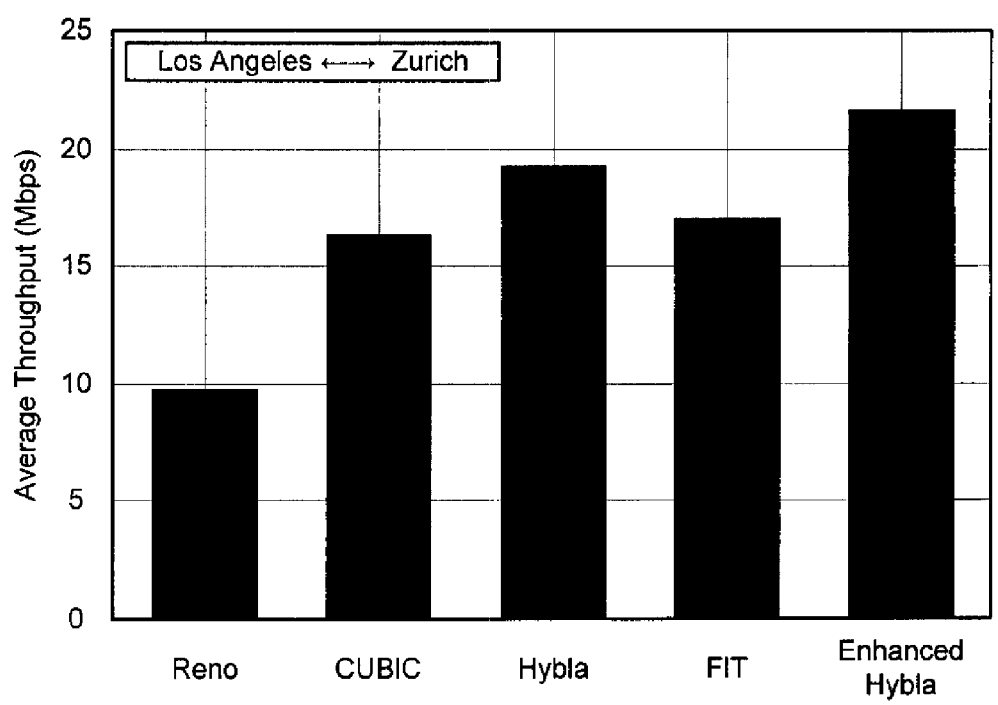
FIG. 5 shows a throughput comparison of different TCP algorithms over a high speed and long distance networks.

A number of experiments were performed to illustrate the performance of the enhanced TCP-Hybla congestion control mechanism. In the experiments, enhanced Hybla and TCP-FIT were embedded into the Linux kernel of TCP servers. FIG. 5 shows a throughput comparison of different TCP algorithms over a high speed and long distance networks. In the experiment, a TCP client located in Zurich, Switzerland, downloaded a 100 MB file from an HTTP Server at Los Angeles, US. The average RTT of the link was 160 ms, packet loss rate was 0%. As shown in FIG. 5, the throughput of enhanced Hybla was higher than other algorithms.

Figure 6:
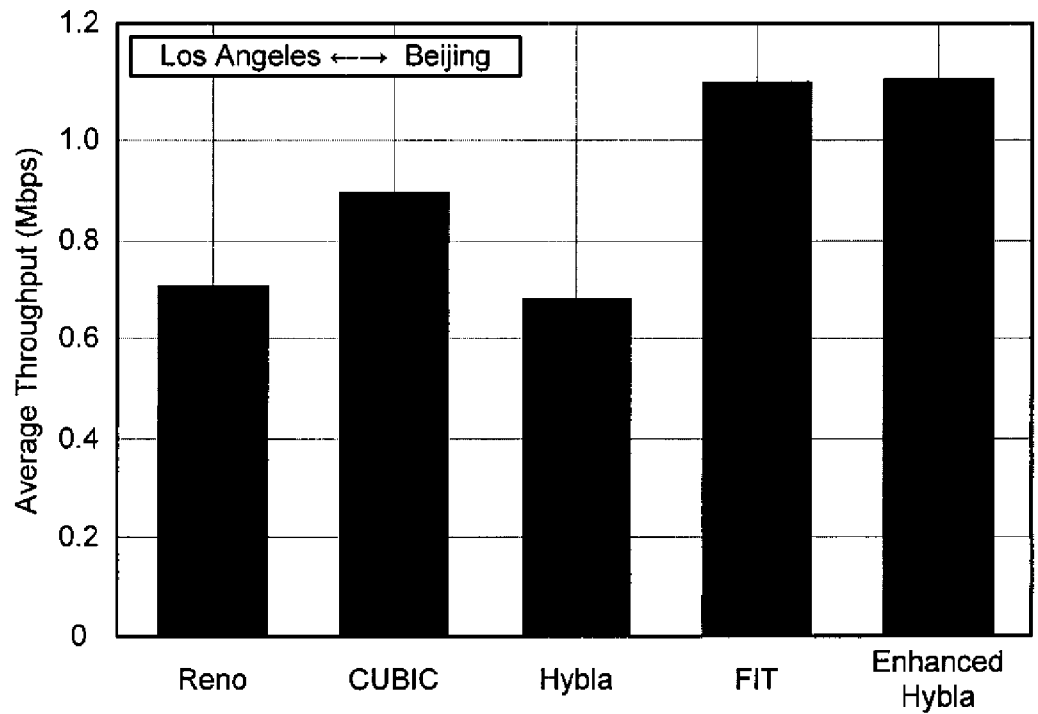
FIG. 6 shows a throughput comparison of different algorithms over a low speed and long distance networks.

FIG. 6 shows a throughput comparison of different algorithms over a low speed and long distance networks. In the experiment, a TCP client located in Beijing, China, downloaded a 10 MB file from an HTTP Server at Los Angeles, US. The average RTT of the link was 210 ms, packet loss rate was 0.1%. As shown in FIG. 6, the throughput of the enhanced TCP-Hybla was close to TCP-FIT and higher than other algorithms. The results of the experiments depicted in FIGS. 5 and 6 demonstrate the performance improvement of the enhanced TCP-Hybla over high latency networks with random packet loss.

Figure 7:
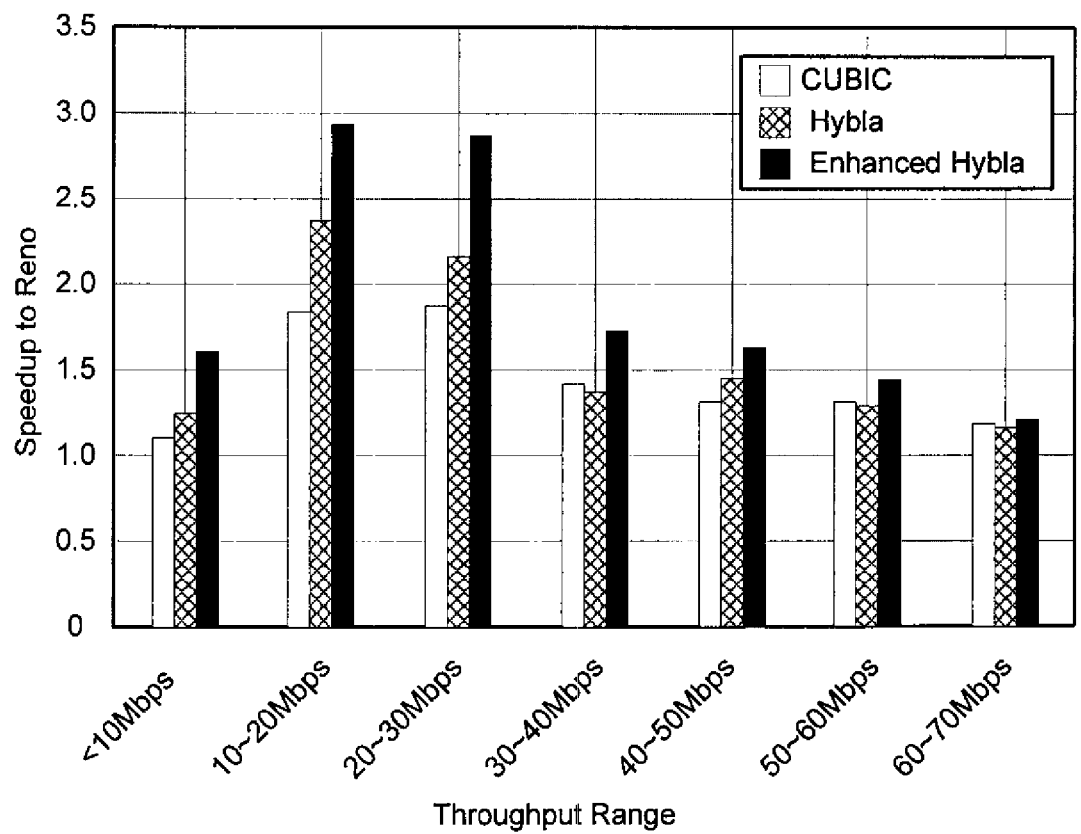
FIG. 7 shows throughput speedup of different algorithms compared to TCP Reno.

The performance of enhanced TCP-Hybla over large scale networks was tested over the PlanetLab testbed. PlanetLab is a group of computers available as a testbed for computer networking and distributed systems research. The throughput of enhanced TCP-Hybla was tested on PlanetLab. The throughput was compared with standard TCP Hybla, TCP CUBIC and TCP Reno. In the tests, 153 PlanetLab nodes located in 78 cities of 32 countries were used to download video clips from HTTP servers located in Los Angeles, US. These nodes were able to represent the condition of the current Internet. In the experiments, the PlanetLab nodes were divided into several groups according to their available network bandwidth. The throughput speedup of different algorithms compared to TCP Reno was plotted by groups in FIG. 7. As shown in FIG. 7, enhanced TCP Hybla achieved improved performance compared with the other TCP algorithms.

The above has described an enhance TCP Hybla congestion control mechanism that sets the congestion window size based on a number N of parallel virtual Hybla connections. A further enhanced TCP Hybla, referred to as enhanced start Hybla congestion control mechanism described further below, maintains the congestion window based on a combination of virtual Hybla connections and virtual Reno connections. The enhanced start Hybla congestion control mechanism maintains the congestion window using a number, $N_1$, of parallel virtual TCP Hybla connections and a number, $N_2$, of parallel virtual TCP-Reno connections.

Similar to the congestion control mechanism described above, the enhanced start Hybla congestion control mechanism adjusts the number of virtual connections according to the network conditions. The sum of $N_1$ and $N_2$, i.e. the number of virtual connections, is given the notation N, and is updated periodically. For example, N may be updated every 1000 milliseconds. N may be updated according to:

$$N_{t+1} = N_t + \sigma - N_t \cdot \partial \cdot \frac{RTT_{average} - RTT_{min}}{RTT_{average}} \quad (15)$$

where $N_{t+1}$ is the updated number of parallel virtual connection sessions; $N_t$ is the current number of parallel virtual connection sessions; $\sigma$ and $\tau$ are selected positive parameters. $\sigma$ may be set to 1 and $\tau$ may be set as ½. $RTT_{average}$ is the average round trip time in a previous estimation period and $RTT_{min}$ is the minimal value for the round trip time for a previous window of time.

The virtual TCP-Hybla connections number, $N_1$, and the virtual TCP-Reno connections number, $N_2$, are proportional to N $$\begin{cases} N_1 = N \cdot \gamma \\ N_2 = N \cdot (1 - \gamma) \end{cases} \quad (16)$$

where $\gamma$ is a parameter selected to be between 0 and 1. A default value of $\gamma$ may be ½. The selection of $\gamma$ can be used to balance the aggressiveness of the Hybla portion of the congestion control with the more stable performance of the Reno portion of the congestion control. Both $N_1$ and $N_2$ can be periodically adjusted in order to balance the aggressiveness of TCP Hybla with the stableness of TCP Reno. The values of $N_1$ and $N_2$ can be determined based on current network conditions, past network conditions, or an estimation of future network conditions.

For every virtual TCP-Hybla connection, there is a normalized RTT provided by $$\rho = \frac{RTT_{average}}{(RTT_0 + RTT_{min})/2}, \quad (17)$$

where $RTT_0$ is the reference round trip time as described above.

The enhanced start Hybla congestion control mechanism can operate in different modes. A slow start threshold ($SS_{thresh}$) can be used to determine when to switch from one mode to another. $SS_{thresh}$ may be set based on the window size when a loss even occurs. For example, $SS_{thresh}$ may be set to $$Cwnd, \frac{Cwnd}{2}, \left(1 - \frac{2}{3N}\right) \cdot Cwnd$$

or other values. While the congestion window is less than $SS_{thres}$, the enhanced start Hybla operates in a slow start phase. In the slow start phase, the enhanced start Hybla maintains the congestion window, Cwnd, according to:

$$\begin{cases} Cwnd_{i+1} = Cwnd_i + N_1 \cdot (2^\rho - 1) + N_2, & \text{for each } ACK \\ Cwnd_{i+1} = Cwnd_i - Cwnd_i \cdot \frac{2}{3 \cdot (N_1 + N_2)}, & \text{for each LOSS} \end{cases} \quad (18)$$

Once the congestion window is larger than $SS_{thresh}$, the enhanced start Hybla switches to a congestion avoidance phase. In the congestion avoidance phase, the congestion window is adjusted according to:

$$\begin{cases} Cwnd_{i+1} = Cwnd_i + N_1 \cdot \frac{\rho^2}{Cwnd_i} + N_2 \cdot \frac{1}{Cwnd_i}, & \text{each } ACK \\ Cwnd_{i+1} = Cwnd_i - Cwnd_i \cdot \frac{2}{3 \cdot (N_1 + N_2)}, & \text{each LOSS} \end{cases} \quad (19)$$

The above has described various TCP congestion control mechanisms that can improve the throughput for high latency networks that experience packet loss. It is contemplated that any or all of these hardware and software components could be embodied exclusively in hardware, exclusively in software, exclusively in firmware, or in any combination of hardware, software, and/or firmware. Accordingly, while the following describes example methods and system, persons having ordinary skill in the art will readily appreciate that the examples provided are not the only way to implement such methods and apparatus. It will be apparent to one skilled in the art that numerous modifications and departures from the specific embodiments described herein may be made without departing from the spirit and scope of the present invention.

What is claimed is:

1. A method performed by a computing device for congestion control of a communication session over a heterogeneous network having a high latency link, the method comprising:
   determining a round trip time (RTT) for the communication session;
   determining a normalized RTT ($\rho$) based on an equalizing round trip time ($RTT_0$);
   determining a number, N, of virtual communication sessions;
   setting a congestion window (Cwnd) size for the communication session based on N TCP Hybla virtual communication sessions and $\rho$, wherein:
   the congestion window is set according to:

For Each $ACK$: $Cwnd \leftarrow Cwnd + N \cdot \rho$

For Each Loss: $Cwnd \leftarrow Cwnd - \frac{2}{3N+1} \cdot Cwnd$;

$\rho$ is calculated according to:

$$\rho = \frac{RTT}{RTT_0};$$

the number of virtual communication sessions is determined according to:

$$N_{t+1} := \max\left\{1, N_t + 1 - \frac{RTT_t - RTT_{min}}{\alpha \cdot RTT_t} N_t\right\}$$

where:
   $N_t$ is the value of N at an updating period t;
   $RTT_t$ is an average value of RTT for the updating period t;
   $RTT_{min}$ is the minimal observed RTT value for the updating period t; and
   $\alpha$ is a preset parameter such that $\alpha \in (0,1)$; and
   wherein N is determined as a combination of a number, $N_1$, of virtual TCP Hybla communication sessions and a number, $N_2$, of TCP Reno sessions, wherein $N_1$ and $N_2$ are set according to:

$$\begin{cases} N1 = N \cdot \gamma \\ N2 = N \cdot (1 - \gamma) \end{cases}$$

where
   $\gamma \in (0,1)$; and
   transmitting packets of the communication session, over the heterogeneous network having the high latency link, according to the set value of Cwnd.

2. The method of claim 1, further comprising increasing Cwnd for received ACKs, when operating in a slow start phase, according to:

$Cwnd_{i+1} = Cwnd_i + N_1 \cdot (2^\rho - 1) + N_2$.

3. The method of claim 2, further comprising increasing Cwnd for received ACKs, when operating in a congestion avoidance phase, according to:

$$Cwnd_{i+1} = Cwnd_i + N_1 \cdot \frac{\rho^2}{Cwnd_i} + N_2 \cdot \frac{1}{Cwnd_i}.$$

4. The method of claim 3, further comprising decreasing Cwnd for packet loss events, according to:

$$Cwnd_{i+1} = Cwnd_i - Cwnd_i \cdot \frac{2}{3 \cdot (N_1 + N_2)}.$$

5. The method of claim 4, wherein $N_1$ and $N_2$ are determined periodically to balance the aggressiveness of the Hybla portion of the congestion control with the more stable performance of the Reno portion of the congestion control.

6. The method of claim 1, further comprising:
determining if Cwnd is larger than a slow start threshold ($SS_{thresh}$); and
operating in a slow start phase when Cwnd is less than $SS_{thresh}$ and operating in a congestion avoidance phase when Cwnd is larger than $SS_{thresh}$.

7. A computing device for communicating over a network, the computing device comprising:
a processor for executing instructions; and
a memory for storing instructions, which when executed by the processor configure the computing device to perform a method according claim 1.

8. A non-transitory computer readable medium storing instructions for configuring a computing device to perform a method according to claim 1.

9. A method performed by a computing device for congestion control of a communication session over a heterogeneous network having a high latency link, the method comprising:
determining a round trip time (RTT) for the communication session;
updating an average RTT value ($RTT_{average}$) using the determined RTT;
updating a minimum RTT ($RTT_{min}$) with the determined RTT when the determined RTT is less than $RTT_{min}$;
determining a normalized RTT ($\rho$) based on an equalizing round trip time ($RTT_0$);
determining a number, N, of virtual communication sessions;
setting a congestion window (Cwnd) size for the communication session based on N TCP Hybla virtual communication sessions and $\rho$;
determining if Cwnd is larger than a slow start threshold ($SS_{thresh}$);
operating in a slow start phase when Cwnd is less than $SS_{thresh}$ and operating in a congestion avoidance phase when Cwnd is larger than $SS_{thresh}$,
wherein $\rho$ is calculated according to:

$$\rho = \frac{RTT_{average}}{(RTT_0 + RTT_{min})/2};$$

and
transmitting packets of the communication session, over the heterogeneous network having the high latency link, according to the set value of Cwnd.

10. The method of claim 9, where N is determined according to:

$$N_{t+1} = N_t + \alpha - N_t \cdot \beta \cdot \frac{RTT_{average} - RTT_{min}}{RTT_{average}},$$

where:
$N_t$ is the value of N at an updating period t;
$RTT_t$ is an average value of RTT for the updating period t;
$RTT_{min}$ is the minimal observed RTT value for the updating period t;
$\alpha$ is a pre-set parameter such that $\alpha>0$; and
$\beta$ is a pre-set parameter such that $\beta>0$.

11. The method of claim 10, wherein N is determined as a combination of a number, $N_1$, of virtual TCP Hybla communication sessions and a number, $N_2$, of TCP Reno sessions, wherein $N_1$ and $N_2$ are set according to:

$$\begin{cases} N1 = N \cdot \gamma \\ N2 = N \cdot (1 - \gamma) \end{cases}$$

where
$\gamma \in (0,1)$.

12. The method of claim 11, further comprising increasing Cwnd for received ACKs, when operating in the slow start phase, according to:

$$Cwnd_{i+1} = Cwnd_i + N_1 \cdot (2^\rho - 1) + N_2.$$

13. The method of claim 12, further comprising increasing Cwnd for received ACKs, when operating in the congestion avoidance phase, according to:

$$Cwnd_{i+1} = Cwnd_i + N_1 \cdot \frac{\rho^2}{Cwnd_i} + N_2 \cdot \frac{1}{Cwnd_i}.$$

14. The method of claim 13, further comprising decreasing Cwnd for packet loss events, according to:

$$Cwnd_{i+1} = Cwnd_i - Cwnd_i \cdot \frac{2}{3 \cdot (N_1 + N_2)}.$$

15. The method of claim 14, wherein $N_1$ and $N_2$ are determined periodically to balance the aggressiveness of the Hybla portion of the congestion control with the more stable performance of the Reno portion of the congestion control.

* * * * *